(12) United States Patent
Hohlrieder

(10) Patent No.: US 9,259,983 B2
(45) Date of Patent: Feb. 16, 2016

(54) ADJUSTABLE AIRCRAFT TOWBAR

(71) Applicant: Hans Hohlrieder, Yorktown, VA (US)

(72) Inventor: Hans Hohlrieder, Yorktown, VA (US)

(*) Notice: Subject to any disclaimer, the term of this patent is extended or adjusted under 35 U.S.C. 154(b) by 268 days.

(21) Appl. No.: 13/839,271

(22) Filed: Mar. 15, 2013

(65) Prior Publication Data

US 2014/0265247 A1 Sep. 18, 2014

(51) Int. Cl.
*B60D 1/54* (2006.01)
*B60D 1/155* (2006.01)
*B60D 1/167* (2006.01)

(52) U.S. Cl.
CPC ............... *B60D 1/155* (2013.01); *B60D 1/167* (2013.01); *B60D 1/54* (2013.01)

(58) Field of Classification Search
CPC ............. B60D 1/00; B60D 1/14; B60D 1/36; B60D 1/44; B60D 1/46; B60D 1/52; B60D 1/54; B60D 1/145; B60D 1/155; B60D 1/167; B60D 1/1675; B60D 1/481; B60D 1/485; B60D 1/488; B62D 53/021
See application file for complete search history.

(56) References Cited

U.S. PATENT DOCUMENTS

| | | | | |
|---|---|---|---|---|
| 1,895,992 A * | 1/1933 | Hepburn | ................... | 280/510 |
| 2,635,891 A * | 4/1953 | Cook | ...................... | 280/495 |
| 2,743,118 A * | 4/1956 | Dotson | ................... | 280/478.1 |
| 2,873,982 A * | 2/1959 | Graham | ................. | 280/478.1 |
| 2,878,035 A * | 3/1959 | Downey | ................ | 280/482 |
| 3,004,773 A * | 10/1961 | Ankeney | .................. | 280/446.1 |
| 3,181,893 A * | 5/1965 | Jopson et al. | ............. | 280/494 |
| 3,331,619 A * | 7/1967 | Muelling | ................. | 280/460.1 |
| 4,269,429 A * | 5/1981 | Eichstadt | ................. | 280/503 |
| 4,799,711 A * | 1/1989 | Moore | ..................... | 280/444 |
| 4,913,451 A * | 4/1990 | Woodall | .................. | 280/478.1 |
| 5,039,120 A * | 8/1991 | Stowe | ...................... | 280/204 |
| 5,167,423 A * | 12/1992 | Hall, Jr. | .................... | 280/486 |
| 5,322,315 A * | 6/1994 | Carsten | ................... | 280/479.2 |
| 5,465,993 A * | 11/1995 | Gee et al. | ................. | 280/491.5 |
| 5,494,310 A * | 2/1996 | Soles | ....................... | 280/450 |
| 5,547,210 A * | 8/1996 | Dugger | ................... | 280/477 |
| 5,690,182 A * | 11/1997 | Ward | ........................ | 172/439 |
| 5,755,454 A * | 5/1998 | Peterson | .................. | 280/491.1 |
| 5,845,922 A * | 12/1998 | Warner | ................... | 280/493 |
| 6,125,945 A * | 10/2000 | Skaggs et al. | ............. | 172/439 |
| 6,889,994 B1 * | 5/2005 | Birkenbaugh | ........... | 280/491.2 |
| 7,052,032 B1 * | 5/2006 | Adair | ....................... | 280/479.3 |
| 2002/0053782 A1 * | 5/2002 | Peters | ..................... | 280/504 |
| 2005/0263984 A1 * | 12/2005 | Gurtler | ................... | 280/489 |
| 2007/0182125 A1 * | 8/2007 | MacDougall | ............. | 280/415.1 |
| 2010/0148471 A1 * | 6/2010 | McConnell | .............. | 280/511 |
| 2010/0232925 A1 * | 9/2010 | Cullum | ................... | 414/800 |
| 2010/0320739 A1 * | 12/2010 | Kittrell | .................... | 280/789 |
| 2011/0140393 A1 * | 6/2011 | Padilla et al. | ............. | 280/490.1 |

* cited by examiner

*Primary Examiner* — Joseph Rocca
*Assistant Examiner* — Marc A Scharich

(57) ABSTRACT

An improved aircraft towing apparatus, which is attachable to a small vehicle such as a golf or utility vehicle. The apparatus has a swiveling hitch bar pivotally mounted to a vehicle and a tow bar sleeve pivotally mounted to the center of the hitch bar, with the tow bar sleeve positioned underneath of the hitch bar. The device further comprises an extendable tow bar which is positioned within the tow bar sleeve. The tow bar is slidably insertable into the tow bar sleeve. The tow bar, when not in use, may be slid back through the tow bar sleeve such that the majority of the length of the tow bar is secured out of the way underneath the chassis of the utility vehicle.

9 Claims, 3 Drawing Sheets

ADJUSTABLE AIRCRAFT TOWBAR

BACKGROUND OF THE INVENTION

The present invention relates to towing devices. More particularly, the present invention relates to mountable, swiveling and adjustable towbars for use with small and light aircraft.

Private and commercial aircraft owners who utilize small or light aircraft are faced with a dilemma: the aircraft must be maneuvered on the ground. This must be accomplished safely and efficiently. However, cost and manpower restraints result in such small or light aircraft owners having to rely upon little or no assistance and without the ability to use or purchase the large, expensive aircraft tows that are employed by commercial and private owners of large aircraft. Often, the private owner of an aircraft must handle the aircraft on the ground without any assistance which can limit the owner's ability to move and store the aircraft. Even relatively very small single- or twin-engine private aircraft can require a significant towing or moving force just to move the aircraft into or out of a hanger or other protected area. In addition, in the event the aircraft has mechanical or other issues which require maintenance or repairs, often the aircraft must be moved to a location where such maintenance or repairs can be affected. In all of these instances, the aircraft owner or operator is significantly limited in the towing and moving resources that are available to him.

While the current art contains hand operated towing devices, including devices that operate using gas engines and the like, such solutions require keeping the separate equipment that is not dual-purpose.

It is common practice for small commercial and private aircraft owners to use small vehicles such as golf carts or utility carts to move people, equipment, supplies, and the like at airports. Given the nature of airport operations and the size of even smaller local or regional airports, often the distances needed to be traveled while at the airport can be cumbersome or simply too far to travel on foot. Especially when moving people with disabilities, luggage, goods and equipment, and the like.

Various types of towing apparatus exists for small aircraft. Towing apparatus has been designed for use with private vehicles, such as the Universal Tow Bar taught by Jopson et al. in U.S. Pat. No. 3,181,893. Other such designs include the Improved Towing Apparatus taught by Soles in U.S. Pat. No. 5,494,310, and Tow Bar for Aircraft taught by Eichstadt in U.S. Pat. No. 4,269,429.

The currently available designs for small or light aircraft have several drawbacks, however. First, many of them are complicated and/or require a specialized vehicle to be operated. Such complexity or the requirement of a specialized vehicle simply adds to the cost and the inaccessibility of such devices to the average small or light aircraft owner. Other current designs for aircraft tow bars attempt to make them universal to any type of vehicle and aircraft, and provide for a towing apparatus that is switched between aircraft and potential towing vehicles. Among other drawbacks to this approach is that such designs are independent of the aircraft or other vehicles already in place and in use by the aircraft owner. Which means that the towing apparatus becomes one more piece of equipment to store, maintain, and keep track of.

What is needed, therefore, is a towing apparatus that takes into account the realities of the limitations and day-to-day needs of the small or light aircraft owner. Such a towing apparatus should be designed so that the towing apparatus utilizes resources already at hand or readily and cheaply available to the aircraft owner. The new towing apparatus should be fairly inexpensive, and allow a small or light aircraft owner to utilize resources already on hand or readily and inexpensively available to not only move aircraft as needed, but to do so with minimal or no assistance.

SUMMARY OF THE INVENTION

The present invention is directed to a new and improved aircraft towing apparatus which is attachable to a small vehicle such as a golf or utility vehicle. A swiveling hitch bar attaches to the front of the vehicle. The hitch bar is pivotally mounted to the vehicle at the two lateral end points of the hitch bar. The hitch bar further comprises a tow bar sleeve pivotally mounted to the center of the hitch bar, with the tow bar sleeve position underneath of the hitch bar. The device further comprises an extendable tow bar which is positioned within the tow bar sleeve. The tow bar sleeve has two aligned holes, the holes being positioned on the top and bottom portion of the tow bar sleeve, through which a pin is placed to secure the tow bar in position. The tow bar is comprised of a length of bar that has a series of evenly spaced holes through the vertical axis, the tow bar being slidably insertable into the tow bar sleeve. The size and placement of the holes in the tow bar correspond to the holes positioned on the top and bottom surfaces of the tow bar sleeve. The tow bar, when not in use, may be slid back through the tow bar sleeve such that the majority of the length of the tow bar is secured out of the way underneath the chassis of the utility vehicle.

At the end of the tow bar distal to the hitch bar and tow bar sleeve, a universal aircraft wheel yoke is pivotally mounted. Such a universal yoke is well known in the industry, and may take many different shapes and designs. The fundamental design of the yoke, however, is that the yoke is comprised of two arms that are placed on the opposite sides of the front wheel of the aircraft to be towed. One of the arms is fixed in place, and the other arm may be moved in or out through a sleeve portion of the yoke such that the distance between the two arm portions is increased or decreased to accommodate various size aircraft wheels. The yoke design as incorporated herein further comprises a threaded set screw which is located in the fixed portion of the yoke; once the yoke arms are positioned as desired on either side of an aircraft wheel, the set screw is tightened so as to prevent the moveable yoke arm from sliding in or out of the sleeve in the yoke. The yoke further comprises a horizontal pin portion that is inserted through the center hub of the aircraft wheel, the horizontal pin portion being insertable into the end portions of the yoke arms, with means to lock the horizontal pin in place in the yoke arms.

The yoke is pivotally connected to the tow bar such that, when the towing apparatus is not in use and the tow bar is positioned back and under the chassis of the utility vehicle, the yoke may be vertically pivoted up against the front portion of the utility vehicle for storage. As a result of the design, construction and mounting of the present invention, the towing device described herein may be permanently attached to a utility vehicle, stowed conveniently when not in use, and may be utilized for a wide range of small and light aircraft towing applications.

It is therefore an object of the present invention to provide for a new, improved towing apparatus for small and light aircraft.

It is a further object of the present invention to provide for a new, improved towing apparatus that may be used for boats and other trailer-carried items.

It is a further object of the present invention to provide for a new, improved towing apparatus that is suitable for both pushing and pulling an aircraft or other object.

It is a further object of the present invention to provide for a new, improved towing apparatus that is adjustable to various small and light aircraft designs and sizes, and that may be operated by a single user.

It is a further object of the present invention to provide a new, improved towing apparatus that may be permanently attached to a utility vehicle.

DETAILED DESCRIPTION OF A PREFERRED EMBODIMENT

Figure 1:
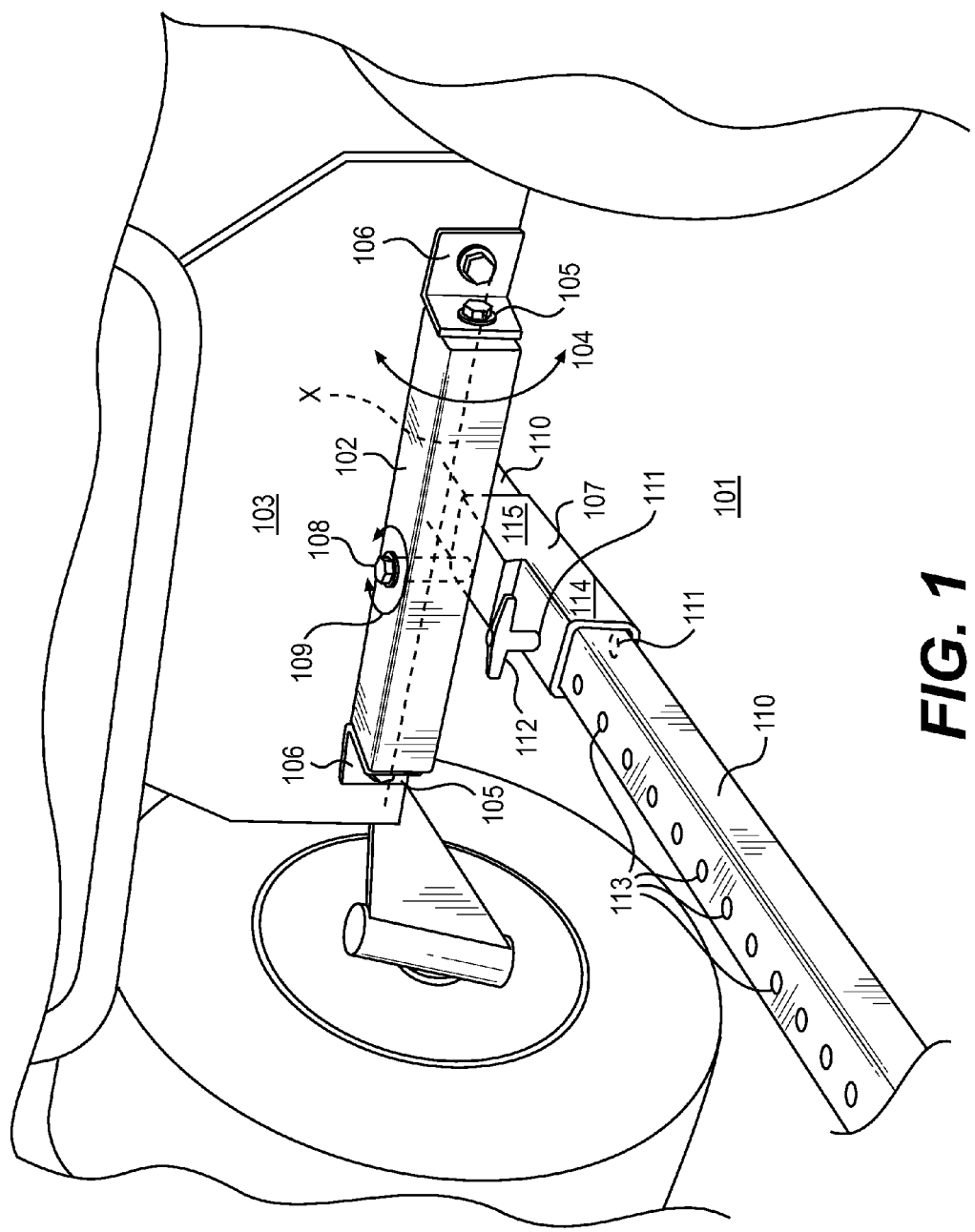
FIG. 1 is a view of an embodiment of the present invention showing the device as attached to a utility vehicle.

Referring now to FIG. 1, an embodiment of the current invention, a towing device 101, is shown. A swiveling hitch bar 102 attaches to the front 103 of a golf or utility vehicle. The hitch bar 102 is pivotally mounted to the vehicle at the two lateral end points 105 of the hitch bar 102, such that a pivoting motion 104 about a horizontal axis X of the hitch bar 102 is achieved when the hitch bar 102 rotates about the horizontal axis X. The mounting brackets 106 as shown are "L" mounts with the pivot of the hitch bar 102 allowed at the end points 105 through attachment using any number of well-known means to provide for pivoting mechanical motion. In the present invention, such a motion may be provided by offset bolts (not shown) leaving space between the hitch bar 102 and the mounting brackets 106, thus leaving the hitch bar 102 free to rotate.

The hitch bar 102 further comprises a tow bar sleeve 107 with a vertical pivot mount 108 at the center of the hitch bar 102, with the tow bar sleeve 107 positioned underneath of the hitch bar. As with the pivoting portion of the hitch bar 102, the use of spacers, offset bolts, and the like to allow rotation are well known. The pivot mount 108 runs vertically through the hitch bar 102, allowing the tow bar sleeve 107 to rotate about the vertical axis of the pivot mount 108 as shown 109. The tow bar sleeve 107 is a structure that is open at the front 114 and the rear 115, allowing a tow bar 110 to pass completely through the tow bar sleeve 107. Although the tow bar sleeve 107 is shown being positioned under the center portion of the hitch bar 102, it will be understood that it may be advantageous depending upon vehicle type and intended use for the tow bar sleeve 107 to be mounted in a position underneath the hitch bar 102 that is offset from the center (not shown). It will be further understood that, in some applications, it may be desirous to have the pivot point comprise a universal joint or other pivoting mechanism such that the tow bar sleeve 107 may rotate outside of the vertical axis.

The device further comprises an extendable tow bar 110 which is positioned within the tow bar sleeve 107. The tow bar sleeve 107 has two aligned holes 111, the holes 111 being positioned on the top and bottom portion of the tow bar sleeve 107, through which a pin 112 is placed to secure the tow bar 110 in position. The tow bar 110 is comprised of a length of bar, preferentially lightweight but sturdy metal, which has a series of evenly spaced aligned sets of holes 113 vertically extending through the tow bar 110, the tow bar 110 being insertable into the tow bar sleeve 107. The size and placement of the holes 113 in the tow bar 110 correspond to the holes 111 positioned on the top and bottom surfaces of the tow bar sleeve 107. The tow bar 110, when not in use, may be slid back through the tow bar sleeve 107 such that the majority of the length of the tow bar 110 is secured out of the way underneath the chassis of the utility vehicle. FIG. 1 shows a portion of the tow bar 110 extending beyond the tow bar sleeve 107. In use, whether moving the tow bar 110 into position to tow an aircraft or into position for storage, the pin 112 is removed, the tow bar 110 is moved forward or backwards in the tow bar sleeve 107 until the desired position is reached, and then the pin 112 is reinserted through the tow bar sleeve 107 holes 111, corresponding to a set of holes 113 in the tow bar 110, thus securing the tow bar in place.

Figure 2:
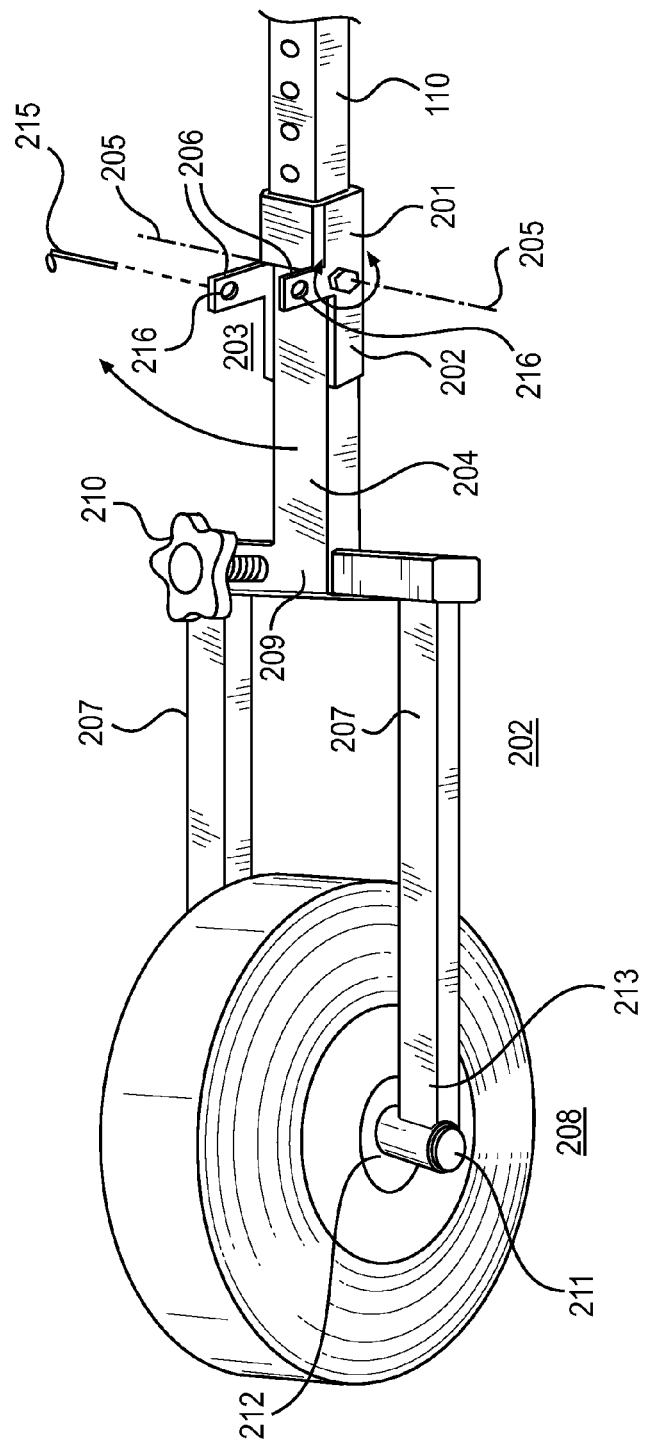
FIG. 2 is a view of an embodiment of the present invention showing the adjustable towing attachment as affixed to an aircraft wheel.
Figure 3:
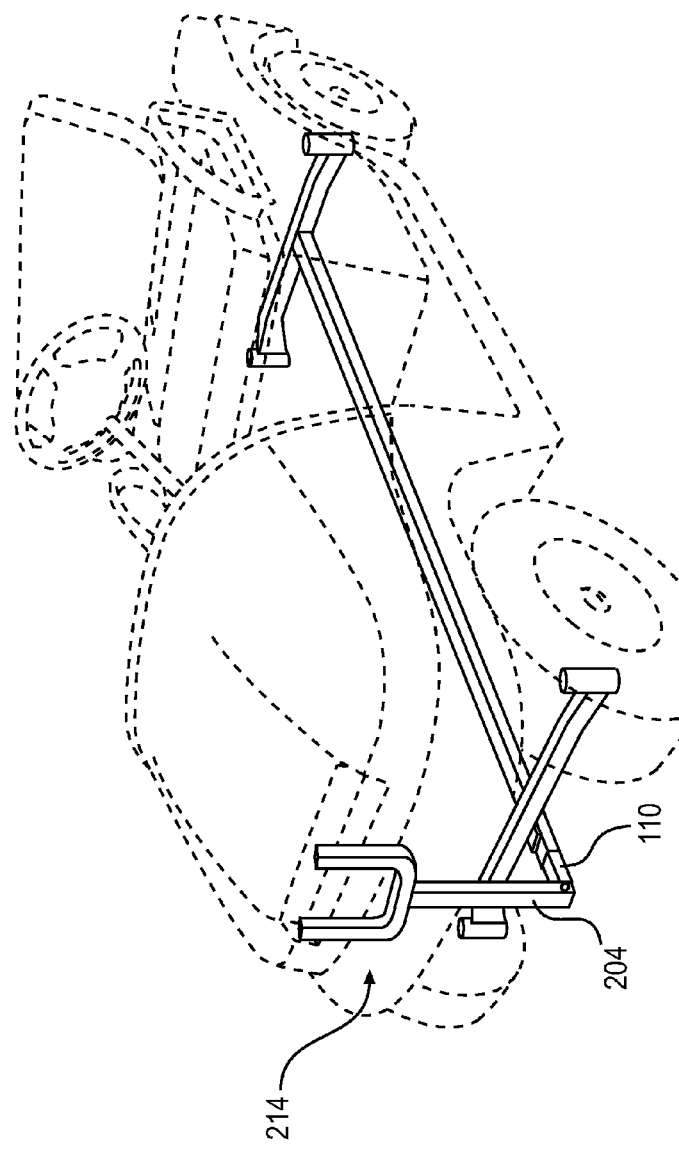
FIG. 3 is a view of an embodiment of the present invention showing the invention in the stowed position on a utility vehicle.

Referring now to FIG. 2, the portion of the present invention intended to be attached to an aircraft wheel is shown. The tow bar 110 is permanently affixed, by mechanical means, welding, or the like, to an end portion 201. The end portion 201 provides a pivoting mounting means for a universal aircraft wheel yoke 214. The end portion 201 comprises a cradle portion 202 that is open at a top side 203. The connecting arm 204 of the yoke 214 is placed within the cradle portion 202, and at the pivot point 205, the connecting arm 204 is pivotally mounted to the cradle portion 202. The pivot point 205 allows the yoke 214 to be rotated to a vertical (upright) position in relation to the tow bar 110. While in a horizontal (towing) position (as shown in FIG. 2) the yoke 214 is locked into the horizontal position by inserting a locking (hitch) pin 215 through the corresponding holes 216 in the locking brackets 206. When the yoke 214 is moved into the vertical position, holes in the yoke connecting arm 204 correspond to the holes 216 in the locking brackets 206, allowing the locking pin 215 to be run through the locking brackets 206 and the connecting arm 204 simultaneously, thereby locking the yoke 214 in the vertical (upright) position in relation to the tow bar 110. As noted above, this allows the yoke 214 to be stored upright and out of the way against the front 103 of the golf or utility vehicle (FIG. 1) while the yoke 214 is not in use, as schematically shown in FIG. 3.

Such a universal yoke is well known in the industry, and may take many different shapes and designs. The fundamental design of the yoke 214, and as shown, however, is that the yoke 214 is comprised of two arms 207 that are placed on the opposite sides of the front wheel 208 of the aircraft to be towed. One of the arms 207 is fixed in place, and the other arm 207 may be moved in or out through a sleeve portion 209 of the yoke 214 such that the distance between the two arm portions 207 is increased or decreased to accommodate various size aircraft wheels. The yoke 214 design as incorporated herein further comprises a threaded set screw 210 which is located in the sleeve portion 209 of the yoke 214; once the yoke arms 207 are positioned as desired on either side of an aircraft wheel 208, the set screw 210 is tightened so as to prevent the moveable yoke arm from sliding in or out of the sleeve portion 209. The yoke 214 further comprises a horizontal pin portion 211 that is inserted through the center hub 212 of the aircraft wheel 208, the horizontal pin portion 211 being insertable into the end portions 213 of the yoke arms 207, with means to lock the horizontal pin in place in the yoke arms 207.

As a result of the design, construction and mounting of the present invention, the towing device described herein may be permanently attached to a utility vehicle, stowed conveniently when not in use, and may be utilized for a wide range of small and light aircraft towing applications.

It will be understood that, while the invention is described in detail herein, embodiments exist which are not described herein but which are covered by and fall within the spirit and the scope of the invention as described.

What is claimed:

1. A towing device, the towing device comprising:
   a hitch bar having a mounting point located at each of respective opposing lateral ends of the hitch bar;
   a mounting bracket pivotally attached to each of the respective opposing lateral ends of the hitch bar at each respective mounting point, each mounting bracket being further fixedly attached to a vehicle such that the hitch bar can rotate about a horizontal axis of the hitch bar extending through each of the mounting points;
   a tow bar sleeve comprising a hollow tubular structure having respective openings at a front and a rear of the tow bar sleeve, the hollow tubular structure of the tow bar sleeve being positioned underneath of the hitch bar and pivotally mounted to the hitch bar with a vertical pivot mount extending vertically through the hitch bar such that the tow bar sleeve can pivot in a horizontal direction about the vertical pivot mount, the tow bar sleeve further comprising a set of aligned holes extending vertically through the tow bar sleeve;
   a tow bar comprising at least one set of aligned holes extending vertically through the tow bar, the tow bar being insertable into the tow bar sleeve and configured to extend through both respective openings at the front and the rear of the tow bar sleeve, one set of aligned holes, from the at least one set of aligned holes of the tow bar, being configured for vertical alignment with the set of aligned holes of the tow bar sleeve; and
   a pin configured to be inserted through the vertically aligned sets of aligned holes of the tow bar sleeve and the tow bar to secure the tow bar within the tow bar sleeve.

2. The towing device of claim 1, further comprising an end portion affixed to the tow bar, and an aircraft wheel yoke pivotally connected to the end portion.

3. The towing device of claim 2, wherein the end portion comprises a cradle portion having a top side which is open, a connecting arm of the aircraft wheel yoke is disposed within the cradle portion and pivotally mounted to the cradle portion at a pivot point, and wherein the pivot point allows the aircraft wheel yoke to be rotated to a vertical upright position in relation to the tow bar.

4. The towing device of claim 3, wherein the end portion further comprises locking brackets extending from the end portion, and wherein the aircraft wheel yoke is configured to be locked in either of a horizontal towing position or the vertical upright position by inserting a locking pin through corresponding holes in the locking brackets.

5. The towing device of claim 2, wherein the aircraft wheel yoke comprises a sleeve portion, yoke arms, one of the yoke arms being a moveable yoke arm slidably disposed within the sleeve portion, and a threaded set screw located in the sleeve portion, the threaded set screw preventing the moveable yoke arm from sliding in or out of the sleeve portion.

6. The towing device of claim 5, wherein the aircraft wheel yoke further comprises a horizontal pin portion configured to be inserted through a center hub of an aircraft wheel, the horizontal pin portion being further configured to be inserted and secured into end portions of the yoke arms.

7. The towing device of claim 2, wherein the aircraft wheel yoke comprises a connecting arm pivotally connected to the end portion by pivoting mounting means.

8. The towing device of claim 1, wherein the hitch bar is mounted to a front of the vehicle, and the vehicle is a golf vehicle or a utility vehicle.

9. The towing device of claim 1, wherein the tow bar sleeve is positioned underneath of the hitch bar at a center of the hitch bar.

\* \* \* \* \*